United States Patent
Yamakawa et al.

[11] Patent Number: 5,959,788
[45] Date of Patent: Sep. 28, 1999

[54] IMAGE READOUT LENS WITH SMALL CHROMATIC ABERRATION AND IMAGE READOUT APPARATUS

[75] Inventors: Hiromitsu Yamakawa; Ryoko Otomo, both of Omiya, Japan

[73] Assignee: Fuji Photo Optical Co., Ltd., Saitama, Japan

[21] Appl. No.: 09/012,490

[22] Filed: Jan. 23, 1998

[30] Foreign Application Priority Data

Mar. 7, 1997 [JP] Japan ................................. 9-070402

[51] Int. Cl.$^6$ ................................. G02B 9/62
[52] U.S. Cl. ................................. 359/760
[58] Field of Search ................................. 359/754, 756, 359/759, 760

[56] References Cited

U.S. PATENT DOCUMENTS 5,388,003 2/1995 Naganuma et al. .............. 359/760

FOREIGN PATENT DOCUMENTS

| 5-113535 | 5/1993 | Japan . |
| 5-210048 | 8/1993 | Japan . |
| 5-68686 | 9/1993 | Japan . |
| 6-109971 | 4/1994 | Japan . |
| 6-342120 | 12/1994 | Japan . |

*Primary Examiner*—Huy Mai
*Attorney, Agent, or Firm*—Snider & Chao; Ronald R. Snider

[57] ABSTRACT

Positive first and second lenses each having a convex surface directed onto the object side, a negative third lens having a concave surface directed onto an image side, a negative fourth lens having a concave surface directed onto the object side, and positive fifth and sixth lenses each having a convex surface directed onto the image side are successively disposed from the object side, and predetermined conditional expressions are satisfied, thus yielding an image readout imaging lens suitable for reading out color originals. Successively from the object side, positive first and second lenses L1 and L2 each having a convex surface directed onto the object side, a negative third lens L3 having a concave surface directed onto an image side, a negative fourth lens L4 having a concave surface directed onto the object side, and positive fifth and sixth lenses L5 and L6 each having a convex surface directed onto the image side are disposed, and the following conditional expressions (1) to (6) are satisfied:

$$N_{da} + 0.015\, v_{da} > 2.58 \quad (1)$$

$$N_{db} + 0.015\, v_{db} > 2.58 \quad (2)$$

$$0.59f < f_a < 1.08f \quad (3)$$

$$0.53f < f_b < 1.60f \quad (4)$$

$$0.46 < f_a/f_b < 1.23 \quad (5)$$

$$-0.56f < f_4 < -0.31f \quad (6)$$

4 Claims, 6 Drawing Sheets

EXAMPLE 1

EXAMPLE 1

EXAMPLE 1

EXAMPLE 2

EXMPLE 2

EXAMPLE 2

EXAMPLE 3

EXAMPLE 3

EXAMPLE 3

EXAMPLE 4

EXAMPLE 4

EXAMPLE 4

IMAGE READOUT LENS WITH SMALL CHROMATIC ABERRATION AND IMAGE READOUT APPARATUS

RELATED APPLICATIONS

This application claims the priority of Japanese Patent Application No. 9-70402 filed on Mar. 7, 1997, which is incorporated herein by reference.

BACKGROUND OF THE INVENTION

1. Field of the Invention

The present invention relates to an image readout lens having a small chromatic aberration and an image readout apparatus; and, in particular, to an image readout apparatus such as facsimile or image scanner, and an image readout imaging lens used in its optical system.

2. Description of the Prior Art

As the image readout lens used in facsimile, image scanner, and the like, various types have conventionally been known. For example, those disclosed in Japanese Patent Publication No. 5-68686, and Japanese Unexamined Patent Publication Nos. 5-113535, 5-210048, 6-109971, and 6-342120, and the like have been known.

Each of these lenses, however, has an amount of chromatic aberration which is too large to be used for reading out a very fine color image, and thus is not always satisfactory in terms of performance.

SUMMARY OF THE INVENTION

In view of such circumstances, it is an object of the present invention to provide an image readout lens and image readout apparatus in which chromatic aberration is favorably corrected so as to allow a very fine color original to be read out.

The image readout lens having a small chromatic aberration in accordance with the present invention comprises, successively from an object side, positive first and second lenses each having a convex surface directed onto the object side, a negative third lens having a concave surface directed onto an image side, a negative fourth lens having a concave surface directed onto the object side, and positive fifth and sixth lenses each having a convex surface directed onto the image side, wherein a material forming at least one of the first and second lenses satisfies the following conditional expression (1); a material forming at least one of the fifth and sixth lenses satisfies the following conditional expression (2); of the lenses satisfying the conditional expression (1), the lens having a shorter focal length satisfies the following conditional expression (3); and, of the lenses satisfying the conditional expression (2), the lens having a shorter focal length satisfies the following conditional expression (4):

$Nda + 0.015\, vda > 2.58$ (1)

$Ndb + 0.015\, vdb > 2.58$ (2)

$0.59f < fa < 1.08f$ (3)

$0.53f < fb < 1.60f$ (4)

wherein
f is a focal length of the whole system;
fa is a focal length of the first or second lens (the lens having a shorter focal length when both lenses satisfy conditional expression (1)) using a material satisfying conditional expression (1);

fb is a focal length of the fifth or sixth lens (the lens having a shorter focal length when both lenses satisfy conditional expression (2)) using a material satisfying conditional expression (2);
Nda is a refractive index of a lens material;
Ndb is a refractive index of a lens material;
vda is an Abbe number of a lens material; and
vdb is an Abbe number of a lens material.

Preferably, in this configuration, the following conditional expressions (5) and (6):

$0.46 < fa/fb < 1.23$ (5)

$-0.56f < f4 < -0.31f$ (6)

wherein
f4 is a focal length of the fourth lens
are satisfied.

Further, each lens is preferably constituted by a material which contains neither lead nor arsenic.

The image readout apparatus in accordance with the present invention comprises the above-mentioned image readout lens.

As mentioned above, in accordance with the present invention, successively from the object side, positive first and second lenses each having a convex surface directed onto the object side, a negative third lens having a concave surface directed onto the image side, a negative fourth lens having a concave surface directed onto the object side, and positive fifth and sixth lenses each having a convex surface directed onto the image side are disposed; wherein a material forming at least one of the first and second lenses satisfies conditional expression (1); a material forming at least one of the fifth and sixth lenses satisfies conditional expression (2); of the lenses satisfying the conditional expression (1), the lens having a shorter focal length satisfies conditional expression (3); and, of the lenses satisfying the conditional expression (2), the lens having a shorter focal length satisfies conditional expression (4); whereby axial chromatic aberration and chromatic aberrations upon magnification can be corrected favorably. Accordingly, when this lens is incorporated in an image readout apparatus so as to be used for reading out images, very fine color images can be read out favorably.

In this case, the above-mentioned conditional expressions (1) to (4) are satisfied due to the following reasons.

Namely, below the lower limit of conditional expression (1), it mainly becomes impossible to favorably correct axial chromatic aberration, thus making it difficult to form the respective color images of blue, green, and red on the same plane.

Below the lower limit of conditional expression (2), axial chromatic aberration cannot be corrected favorably, whereby the respective images of blue, green, and red colors cannot be formed on the same plane. Also, chromatic aberration upon magnification cannot be corrected favorably, thereby making it difficult for the respective color images of blue, green, and red to have sizes accurately coinciding with each other.

Below the lower limit of conditional expression (3), spherical aberration and image curvature increase so much that it becomes difficult to obtain a favorable image. Above the upper limit thereof, axial chromatic aberration cannot be corrected favorably, thus making it difficult to form the respective color images of blue, green, and red on the same plane.

Below the lower limit of conditional expression (4), chromatic aberration upon magnification is corrected in excess. Above the upper limit thereof, chromatic aberration upon magnification is corrected insufficiently. In these cases, it becomes difficult for the respective color images of blue, green, and red to have sizes accurately coinciding with each other.

The above-mentioned conditional expressions (5) and (6) are preferably satisfied due to the following reasons.

Below the lower limit of conditional expression (5), chromatic aberration upon magnification is corrected in excess. Above the upper limit thereof, chromatic aberration upon magnification is corrected insufficiently. In these cases, it becomes difficult for the respective color images of blue, green, and red to have sizes accurately coinciding with each other.

Below the lower limit of conditional expression (6), spherical aberration is corrected insufficiently. Above the upper limit thereof, it is corrected in excess. In either cases, favorable imaging performances may not be obtained.

In the configuration mentioned above, when each of the lenses is constituted by a material which contains neither lead nor arsenic (so-called eco-glass species), the image readout lens can have a lighter weight, and even when the lens is discarded, its adverse effect on the environment can be minimized.

DESCRIPTION OF THE PREFERRED EMBODIMENTS

In the following, embodiments of the present invention will be explained.

Figure 1:
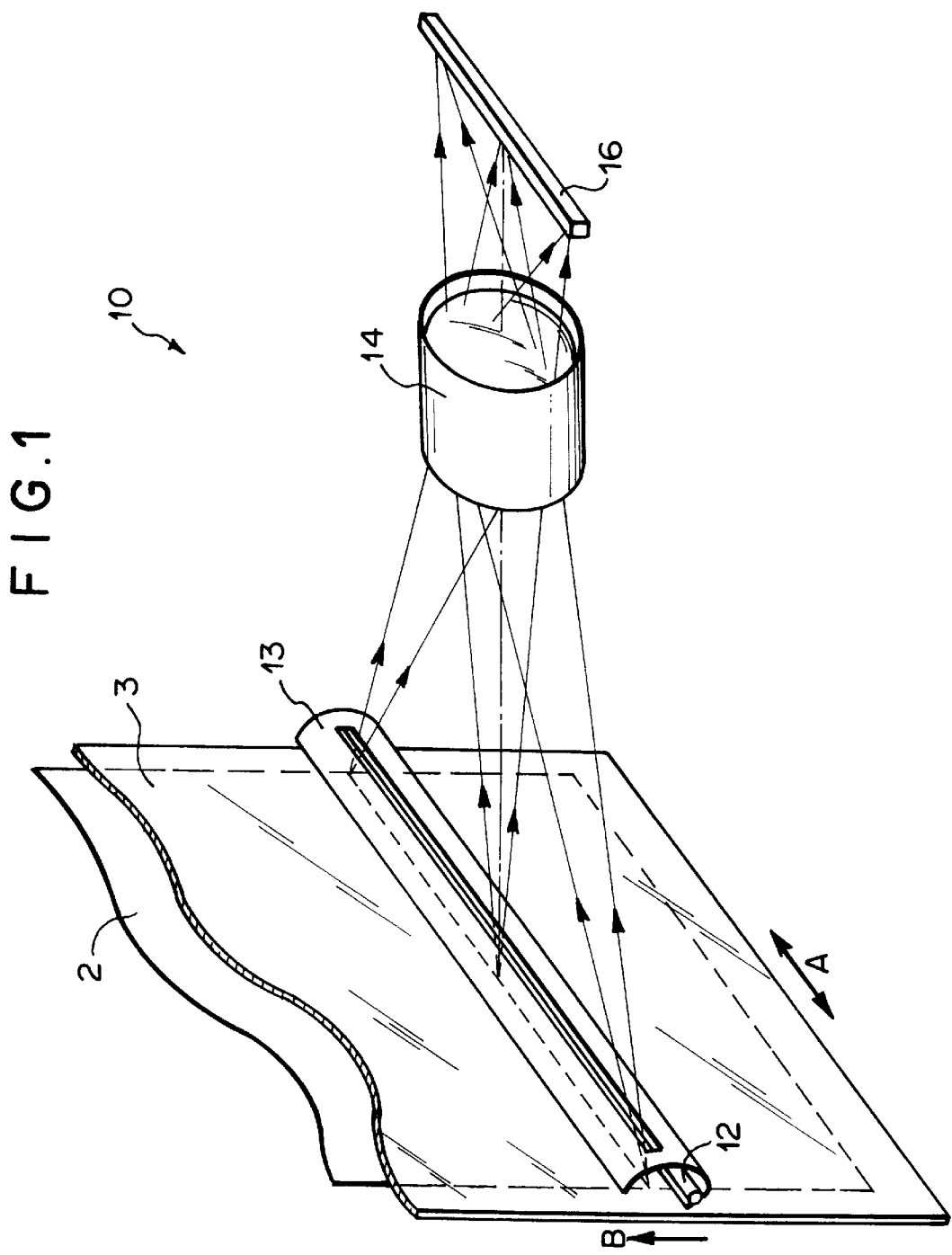
FIG. 1 is a perspective view showing an image readout apparatus equipped with an image readout lens in accordance with an embodiment of the present invention.

FIG. 1 is a perspective view showing an image readout apparatus equipped with an image readout lens in accordance with an embodiment of the present invention.

As depicted, in this image readout apparatus 10, a color original 2 placed on a surface of a glass plate 3 is irradiated with light in a band-like form by means of a linear or linearly-arranged light source (fluorescent light, halogen lamp, LED, and the like) 12 and a reflector 13 along directions of arrow A (shorter side direction), and its reflected luminous flux is converged by an image readout imaging lens 14 so as to form an image on image sensors (CCDs) 16 arranged in one to several rows, whereby the information of the color original 2 in the directions of arrow A (on the shorter side) is read out.

Further, the original 2 is relatively moved in the direction of arrow B with respect to the image readout imaging lens 14, so that the information of the original 2 is read out.

Figure 2:
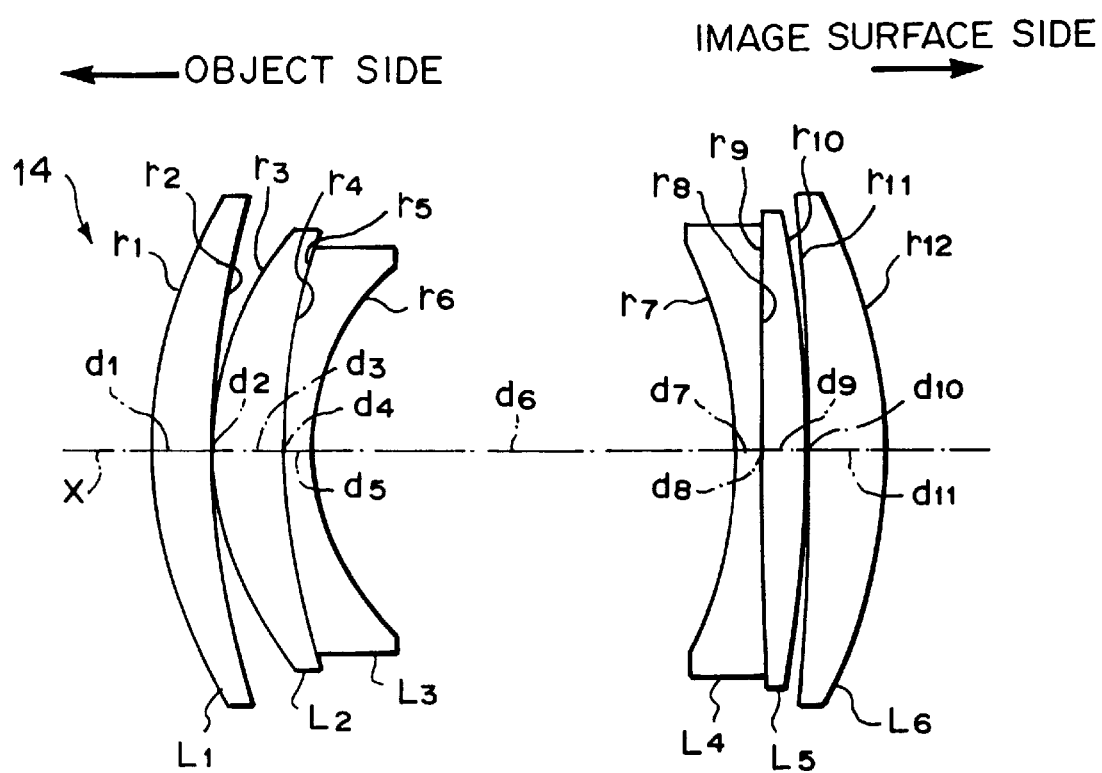
FIG. 2 is a lens configurational view showing the above-mentioned image readout lens.

In order for this image readout apparatus 10 to read out a very fine color image, the imaging lens 14 is required to favorably correct chromatic aberration. In order to enable this feature, the imaging lens 14 has a lens configuration shown in FIG. 2.

Namely, the imaging lens comprises, successively from the object side, positive first and second lenses each having a convex surface directed onto the object side, a negative third lens having a concave surface directed onto the image side, a negative fourth lens having a concave surface directed onto the object side, and positive fifth and sixth lenses each having a convex surface directed onto the image side; wherein a material forming at least one of the first and second lenses satisfies the following conditional expression (1); a material forming at least one of the fifth and sixth lenses satisfies the following conditional expression (2); of the lenses satisfying the conditional expression (1), the lens having a shorter focal length satisfies the following conditional expression (3); and, of the lenses satisfying the conditional expression (2), the lens having a shorter focal length satisfies the following conditional expression (4); and wherein the following conditional expressions (5) and (6) are further satisfied:

$$Nda + 0.015\, \nu da > 2.58 \tag{1}$$

$$Ndb + 0.015\, \nu db > 2.58 \tag{2}$$

$$0.59f < fa < 1.08f \tag{3}$$

$$0.53f < fb < 1.60f \tag{4}$$

$$0.46 < fa/fb < 1.23 \tag{5}$$

$$-0.56f < f4 < -0.31f \tag{6}$$

wherein f is a focal length of the whole system;

fa is a focal length of the first or second lens (the lens having a shorter focal length when both lenses satisfy conditional expression (1)) using a material satisfying conditional expression (1);

fb is a focal length of the fifth or sixth lens (the lens having a shorter focal length when both lenses satisfy conditional expression (2)) using a material satisfying conditional expression (2);

Nda is a refractive index of a lens material;

Ndb is a refractive index of a lens material;

$\nu da$ is an Abbe number of a lens material;

$\nu db$ is an Abbe number of a lens material; and f4 is a focal length of the fourth lens.

In the following, Examples 1 to 7 of the image readout imaging lens in accordance with the present invention will be explained.

The image readout imaging lens in accordance with each example is standardized at a focal length of 100 mm. In order to be actually used in an image readout apparatus, each imaging lens is proportionally reduced or enlarged so as to match the size of an original to be read out, and it is used with a focal length determined for each original size. Each of these imaging lenses is optimal for reading out an original having a shorter side of A3 size or the like. In this case, their focal length will be proportionally reduced in practice.

EXAMPLE 1

Table 1 (follows) shows radius of curvature r (mm) of each lens surface in the image readout lens, center thickness of each lens and air gap between adjacent lenses (hereinafter collectively referred to as axial surface spacing) d (mm), refractive index Nd and Abbe number vd of each lens at d-line, and material (product name) constituting each lens in accordance with this example. In Table 1, numbers successively increase from the object side.

Also, Table 2 (follows) shows specific values of Nda+ 0.015 vda, Ndb+0.015 vdb, fa, fb, fa/fb, and f4 in the above-mentioned conditional expressions (1) to (6). Further, the lower part of Table 2 shows F number (FNo), focal length f of the whole system, magnification (β), and half angle of view (ω).

When the image readout lens in accordance with this example is actually used in an image readout apparatus, it is made to match the size of the original to be read out. When its focal length is proportionally reduced to 66.7 mm, it can be optimized for reading out the shorter side of A3-sized originals.

Figure 3A:
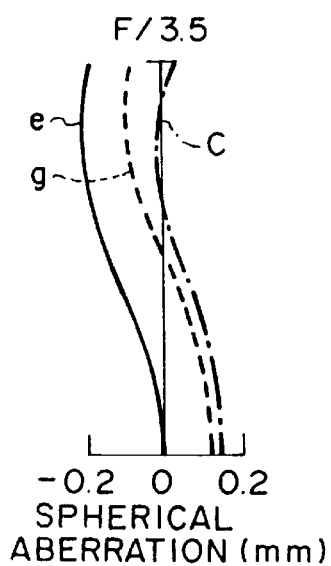
FIGS. 3 (A), (B) and (C) are aberration charts showing various kinds of aberration in the image readout lens in accordance with Example 1 of the present invention.
Figure 3B:
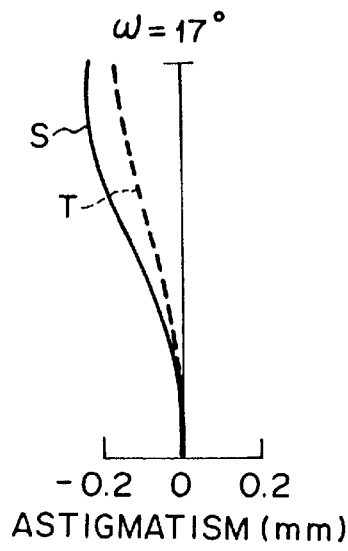
Figure 3C:
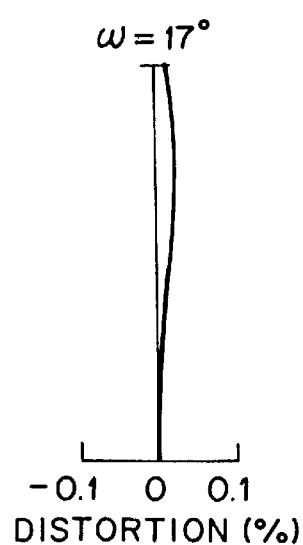

FIG. 3 is an aberration chart showing various kinds of aberration in the image readout imaging lens in accordance with this example. This aberration chart illustrates a case where the focal length is 100 mm, and a glass plate having a thickness of 5.85 mm and a glass plate having a thickness of 1.05 mm are respectively included on the object side and image surface side in its optical path.

As can be seen from this chart, an image readout lens having a favorable imaging performance extending to the periphery of its visual field can be obtained in accordance with this example.

EXAMPLE 2

Table 3 (follows) shows radius of curvature r (mm) of each lens surface in the image readout lens, axial surface spacing d (mm), refractive index Nd and Abbe number vd of each lens at d-line, and material (product name) constituting each lens in accordance with this example. In Table 3, numbers successively increase from the object side.

Also, Table 4 (follows) shows specific values of Nda+ 0.015 vda, Ndb+0.015 vdb, fa, fb, fa/fb, and f4 in the above-mentioned conditional expressions (1) to (6). Further, the lower part of Table 4 shows F number (FNo), focal length f of the whole system, magnification (β), and half angle of view (ω).

When the image readout lens in accordance with this example is actually used in an image readout apparatus, it is made to match the size of the original to be read out. When its focal length is proportionally reduced to 76.5 mm, it can be optimized for reading out the shorter side of A3-sized originals.

Figure 4A:
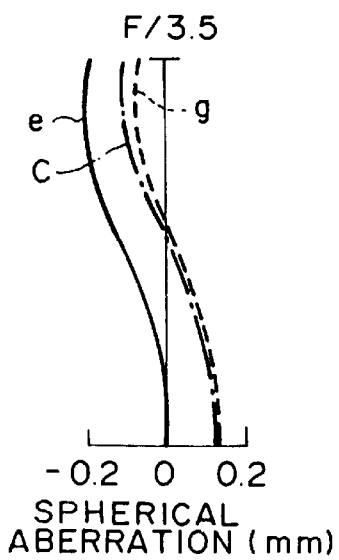
FIGS. 4 (A), (B) and (C) are aberration charts showing various kinds of aberration in the image readout lens in accordance with Example 2 of the present invention.
Figure 4B:
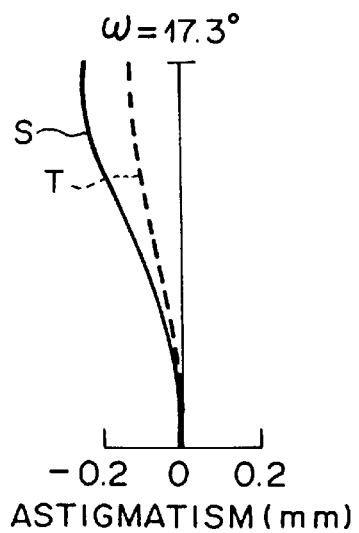
Figure 4C:
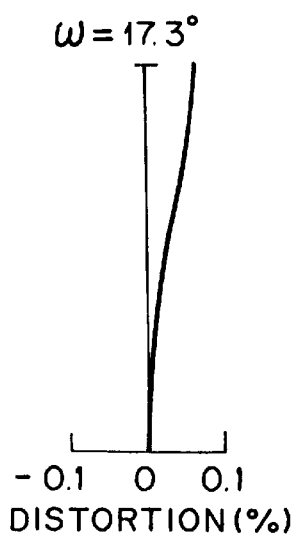

FIG. 4 is an aberration chart showing various kinds of aberration in the image readout imaging lens in accordance with this example. This aberration chart illustrates a case where the focal length is 100 mm, and a glass plate having a thickness of 5.85 mm and a glass plate having a thickness of 1.05 mm are respectively included on the object side and image surface side in its optical path.

As can be seen from this chart, an image readout lens having a favorable imaging performance extending to the periphery of its visual field can be obtained in accordance with this example.

EXAMPLE 3

Table 5 (follows) shows radius of curvature r (mm) of each lens surface in the image readout lens, axial surface spacing d (mm), refractive index Nd and Abbe number vd of each lens at d-line, and material (product name) constituting each lens in accordance with this example. In Table 5, numbers successively increase from the object side.

Also, Table 6 (follows) shows specific values of Nda+ 0.015 vda, Ndb+0.015 vdb, fa, fb, fa/fb, and f4 in the above-mentioned conditional expressions (1) to (6). Further, the lower part of Table 6 shows F number (FNo), focal length f of the whole system, magnification (β), and half angle of view (ω).

When the image readout lens in accordance with this example is actually used in an image readout apparatus, it is made to match the size of the original to be read out. When its focal length is proportionally reduced to 97.8 mm, it can be optimized for reading out the shorter side of A3-sized originals.

Figure 5A:
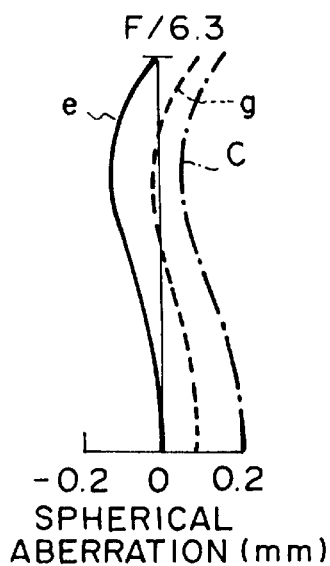
FIGS. 5 (A), (B) and (C) are aberration charts showing various kinds of aberration in the image readout lens in accordance with Example 3 of the present invention.
Figure 5B:
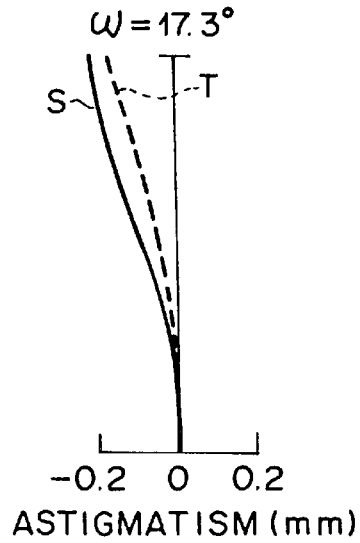
Figure 5C:
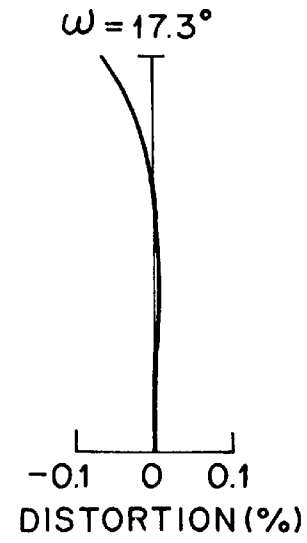

FIG. 5 is an aberration chart showing various kinds of aberration in the image readout imaging lens in accordance with this example. This aberration chart illustrates a case where the focal length is 100 mm, and a glass plate having a thickness of 2.86 mm and a glass plate having a thickness of 0.82 mm are respectively included on the object side and image surface side in its optical path.

As can be seen from this chart, an image readout lens having a favorable imaging performance extending to the periphery of its visual field can be obtained in accordance with this example.

In this example, each lens is constituted by a material which contains neither lead nor arsenic (so-called eco-glass species), whereby the image readout imaging lens can have a lighter weight, and even when the lens is discarded, its adverse effect on the environment can be minimized.

EXAMPLE 4

Table 7 (follows) shows radius of curvature r (mm) of each lens surface in the image readout lens, axial surface spacing d (mm), refractive index Nd and Abbe number vd of each lens at d-line, and material (product name) constituting each lens in accordance with this example. In Table 7, numbers successively increase from the object side.

Also, Table 8 (follows) shows specific values of Nda+ 0.015 vda, Ndb+0.015 vdb, fa, fb, fa/fb, and f4 in the above-mentioned conditional expressions (1) to (6). Further, the lower part of Table 8 shows F number (FNo), focal length f of the whole system, magnification (β), and half angle of view (ω).

When the image readout lens in accordance with this example is actually used in an image readout apparatus, it is made to match the size of the original to be read out. When its focal length is proportionally reduced to 97.8 mm, it can be optimized for reading out the shorter side of A3-sized originals.

Figure 6A:
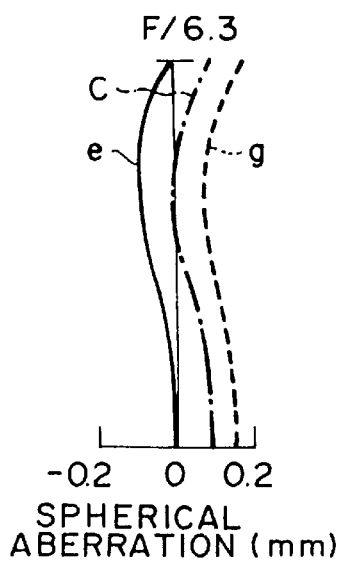
FIGS. 6 (A), (B) and (C) are aberration charts showing various kinds of aberration in the image readout lens in accordance with Example 4 of the present invention.
Figure 6B:
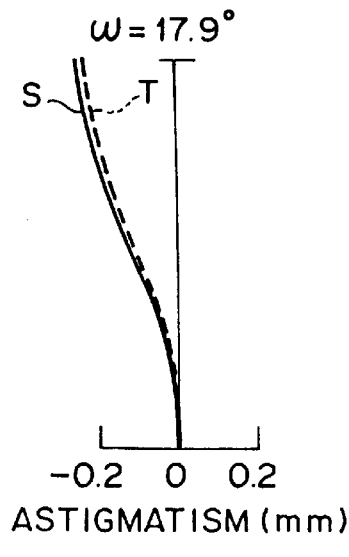
Figure 6C:
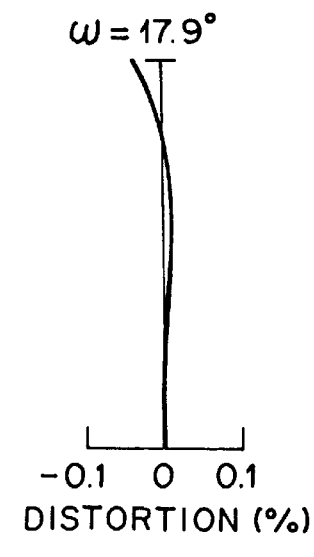

FIG. 6 is an aberration chart showing various kinds of aberration in the image readout imaging lens in accordance with this example. This aberration chart illustrates a case where the focal length is 100 mm, and a glass plate having a thickness of 2.86 mm and a glass plate having a thickness of 0.82 mm are respectively included on the object side and image surface side in its optical path.

As can be seen from this chart, an image readout lens having a favorable imaging performance extending to the periphery of its visual field can be obtained in accordance with this example.

EXAMPLE 5

Table 9 (follows) shows radius of curvature r (mm) of each lens surface in the image readout lens, axial surface spacing d (mm), refractive index Nd and Abbe number vd of each lens at d-line, and material (product name) constituting each lens in accordance with this example. In Table 9, numbers successively increase from the object side.

Also, Table 10 (follows) shows specific values of Nda+ 0.015 vda, Ndb+0.015 vdb, fa, fb, fa/fb, and f4 in the above-mentioned conditional expressions (1) to (6). Further, the lower part of Table 4 shows F number (FNo), focal length f of the whole system, magnification (β), and half angle of view (ω).

When the image readout lens in accordance with this example is actually used in an image readout apparatus, it is made to match the size of the original to be read out. When its focal length is proportionally reduced to 72.1 mm, it can be optimized for reading out the shorter side of A3-sized originals.

Figure 7A:
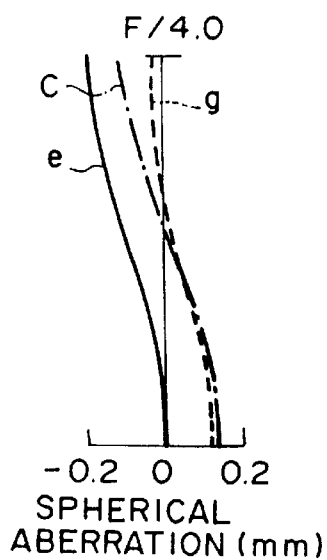
FIGS. 7 (A), (B) and (C) are aberration charts showing various kinds of aberration in the image readout lens in accordance with Example 5 of the present invention.
Figure 7B:
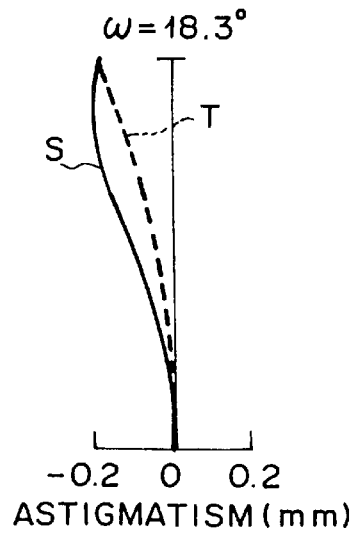
Figure 7C:
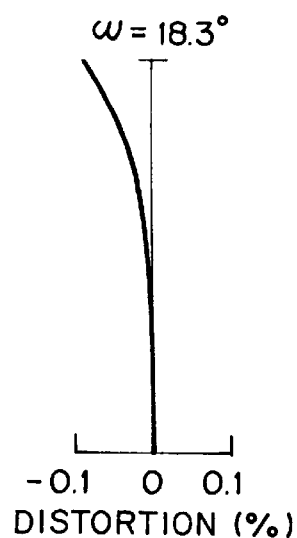

FIG. 7 is an aberration chart showing various kinds of aberration in the image readout imaging lens in accordance with this example. This aberration chart illustrates a case where the focal length is 100 mm, and a glass plate having a thickness of 5.41 mm and a glass plate having a thickness of 0.97 mm are respectively included on the object side and image surface side in its optical path.

As can be seen from this chart, an image readout lens having a favorable imaging performance extending to the periphery of its visual field can be obtained in accordance with this example.

EXAMPLE 6

Table 11 (follows) shows radius of curvature r (mm) of each lens surface in the image readout lens, axial surface spacing d (mm), refractive index Nd and Abbe number vd of each lens at d-line, and material (product name) constituting each lens in accordance with this example. In Table 11, numbers successively increase from the object side.

Also, Table 12 (follows) shows specific values of Nda+ 0.015 vda, Ndb+0.015 vdb, fa, fb, fa/fb, and f4 in the above-mentioned conditional expressions (1) to (6). Further, the lower part of Table 12 shows F number (FNo), focal length f of the whole system, magnification (β), and half angle of view (ω).

When the image readout lens in accordance with this example is actually used in an image readout apparatus, it is made to match the size of the original to be read out. When its focal length is proportionally reduced to 75.0 mm, it can be optimized for reading out the shorter side of A6-sized originals.

Figure 8A:
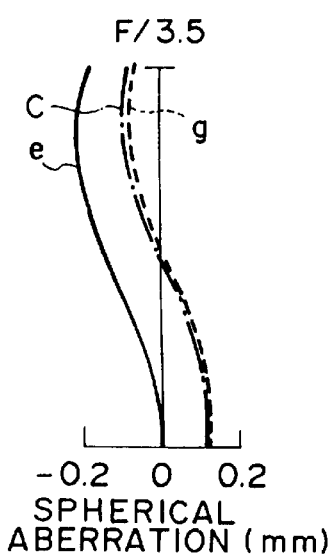
FIGS. 8 (A), (B) and (C) are aberration charts showing various kinds of aberration in the image readout lens in accordance with Example 6 of the present invention.
Figure 8B:
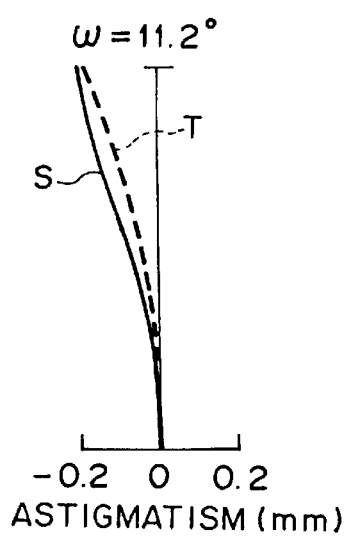
Figure 8C:
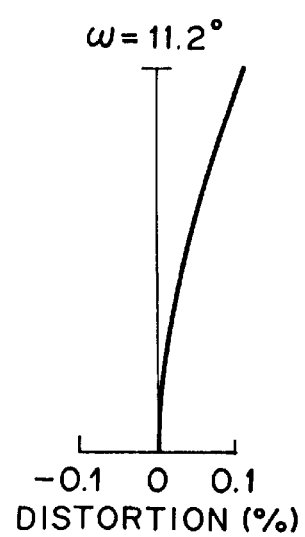

FIG. 8 is an aberration chart showing various kinds of aberration in the image readout imaging lens in accordance with this example. This aberration chart illustrates a case where the focal length is 100 mm, and a glass plate having a thickness of 3.73 mm and a glass plate having a thickness of 0.93 mm are respectively included on the object side and image surface side in its optical path.

As can be seen from this chart, an image readout lens having a favorable imaging performance extending to the periphery of its visual field can be obtained in accordance with this example.

EXAMPLE 7

Table 13 (follows) shows radius of curvature r (mm) of each lens surface in the image readout lens, axial surface spacing d (mm), refractive index Nd and Abbe number vd of each lens at d-line, and material (product name) constituting each lens in accordance with this example. In Table 13, numbers successively increase from the object side.

Also, Table 14 (follows) shows specific values of Nda+ 0.015 vda, Ndb+0.015 vdb, fa, fb, fa/fb, and f4 in the above-mentioned conditional expressions (1) to (6). Further, the lower part of Table 14 shows F number (FNo), focal length f of the whole system, magnification (β), and half angle of view (ω).

When the image readout lens in accordance with this example is actually used in an image readout apparatus, it is made to match the size of the original to be read out. When its focal length is proportionally reduced to 80.0 mm, it can be optimized for reading out the shorter side of Japanese B0-sized originals.

Figure 9A:
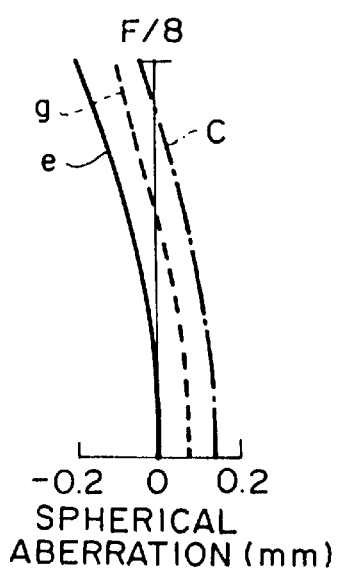
FIGS. 9 (A), (B) and (C) are aberration charts showing various kinds of aberration in the image readout lens in accordance with Example 7 of the present invention.
Figure 9B:
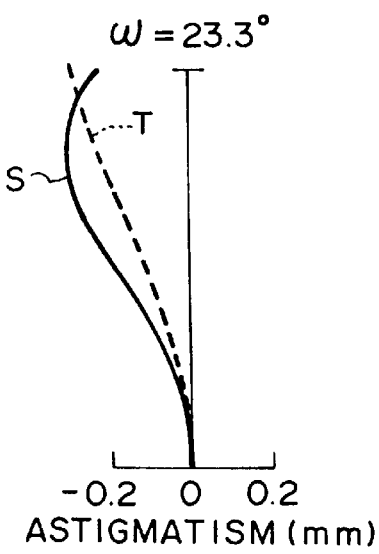
Figure 9C:
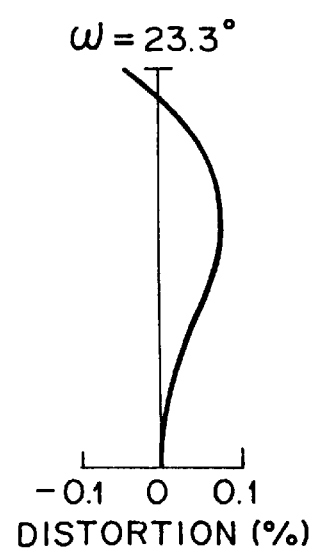

FIG. 9 is an aberration chart showing various kinds of aberration in the image readout imaging lens in accordance with this example. This aberration chart illustrates a case where the focal length is 100 mm, and a glass plate having a thickness of 5.00 mm and a glass plate having a thickness of 1.00 mm are respectively included on the object side and image surface side in its optical path.

As can be seen from this chart, an image readout lens having a favorable imaging performance extending to the periphery of its visual field can be obtained in accordance with this example.

As explained in the foregoing, in accordance with the present invention, various kinds of aberration such as chromatic aberration can be made favorable. When this imaging lens is incorporated in an image readout apparatus so as to be used for reading out images, very fine color images can be read out.

TABLE 1

| Surface | r | d | $N_d$ | $v_d$ | Product name of material | |
|---|---|---|---|---|---|---|
| 1 | 65.421 | 6.45 | 1.77250 | 49.6 | LASF-n7 | (Sumita) |
| 2 | 189.426 | 0.30 | | | | |
| 3 | 26.820 | 8.45 | 1.59240 | 68.3 | GFK-68 | (Sumita) |
| 4 | 50.424 | 0.00 | | | | |
| 5 | 50.424 | 2.88 | 1.71735 | 29.5 | SF-1 | (Sumita) |
| 6 | 23.667 | 32.17 | | | | |
| 7 | −19.288 | 2.97 | 1.62005 | 36.3 | F-2 | (Sumita) |
| 8 | −53.096 | 0.00 | | | | |
| 9 | −53.096 | 7.95 | 1.77250 | 49.6 | LASF-N7 | (Sumita) |
| 10 | −29.012 | 0.32 | | | | |
| 11 | 765.562 | 8.06 | 1.59240 | 68.3 | GFK-68 | (Sumita) |
| 12 | −74.281 | | | | | |

TABLE 2

$N_{da} + 0.015 v_{da} = 2.62$
$N_{db} + 0.015 v_{db} = 2.62$
$f_a = 0.854f$
$f_b = 1.147f$
$f_a/f_b = 0.744$
$f_4 = -0.506f$

| F/3.5 | f = 100 | β = −0.1571 | ω = 17° |

TABLE 3

| Surface | r | d | $N_d$ | $\nu_d$ | Product name of material | |
|---|---|---|---|---|---|---|
| 1 | 67.486 | 5.75 | 1.77250 | 49.6 | LASF-n7 | (Sumita) |
| 2 | 200.941 | 0.38 | | | | |
| 3 | 28.042 | 10.40 | 1.59240 | 68.3 | GFK-68 | (Sumita) |
| 4 | 49.850 | 0.00 | | | | |
| 5 | 49.850 | 2.29 | 1.71735 | 29.5 | SF-1 | (Sumita) |
| 6 | 23.518 | 31.77 | | | | |
| 7 | −19.349 | 2.31 | 1.62005 | 36.3 | F-2 | (Sumita) |
| 8 | −56.824 | 0.00 | | | | |
| 9 | −56.824 | 7.36 | 1.77250 | 49.6 | LASF-N7 | (Sumita) |
| 10 | −27.861 | 1.83 | | | | |
| 11 | ∞ | 6.90 | 1.59240 | 68.3 | GFK-68 | (Sumita) |
| 12 | −67.341 | | | | | |

TABLE 4

$N_{da} + 0.015\nu_{da} = 2.62$
$N_{db} + 0.015\nu_{db} = 2.62$
$f_a = 0.919f$
$f_b = 1.137f$
$f_a/f_b = 0.808$
$f_4 = -0.485f$

F/3.5   f = 100   β = −0.189   ω = 17.3°

TABLE 5

| Surface | r | d | $N_d$ | $\nu_d$ | Product name of material | |
|---|---|---|---|---|---|---|
| 1 | 27.505 | 3.47 | 1.77250 | 49.6 | S-LAH66 | (Ohara) |
| 2 | 49.059 | 0.15 | | | | |
| 3 | 19.445 | 4.06 | 1.49700 | 81.6 | S-FPL51 | (Ohara) |
| 4 | 37.802 | 0.00 | | | | |
| 5 | 37.802 | 1.59 | 1.59551 | 39.2 | S-TIM8 | (Ohara) |
| 6 | 14.418 | 24.61 | | | | |
| 7 | −26.762 | 1.59 | 1.56732 | 42.8 | E-FL6 | (Ohara) |
| 8 | 1035.382 | 0.00 | | | | |
| 9 | 1035.382 | 2.62 | 1.49700 | 81.6 | S-FPL51 | (Ohara) |
| 10 | −77.640 | 0.15 | | | | |
| 11 | −149.361 | 4.41 | 1.77250 | 49.6 | S-LAH66 | (Ohara) |
| 12 | −31.858 | | | | | |

TABLE 6

$N_{da} + 0.015\nu_{da} = 2.72$
$N_{db} + 0.015\nu_{db} = 2.72$
$f_a = 0.751f$
$f_b = 1.454f$
$f_a/f_b = 0.516$
$f_4 = -0.460f$

F/6.3   f = 100   β = −0.252   ω = 17.3°

TABLE 7

| Surface | r | d | $N_d$ | $\nu_d$ | Product name of material | |
|---|---|---|---|---|---|---|
| 1 | 28.451 | 3.63 | 1.77250 | 49.6 | LASF-n7 | (Ohara) |
| 2 | 52.838 | 0.15 | | | | |
| 3 | 20.715 | 4.15 | 1.49700 | 81.6 | S-FPL51 | (Ohara) |
| 4 | 42.794 | 0.00 | | | | |
| 5 | 42.794 | 1.83 | 1.59551 | 39.2 | F-8 | (Ohara) |
| 6 | 15.044 | 23.66 | | | | |
| 7 | −25.833 | 1.60 | 1.56732 | 42.8 | LF-6 | (Ohara) |
| 8 | 948.840 | 0.00 | | | | |
| 9 | 948.840 | 3.07 | 1.49700 | 81.6 | S-FPL51 | (Ohara) |

TABLE 7-continued

| Surface | r | d | $N_d$ | $\nu_d$ | Product name of material | |
|---|---|---|---|---|---|---|
| 10 | −64.177 | 0.15 | | | | |
| 11 | −132.829 | 4.39 | 1.77250 | 49.6 | LASF-n7 | (Ohara) |
| 12 | −31.898 | | | | | |

TABLE 8

$N_{da} + 0.015\nu_{da} = 2.72$
$N_{db} + 0.015\nu_{db} = 2.72$
$f_a = 0.760f$
$f_b = 1.211f$
$f_a/f_b = 0.628$
$f_4 = -0.443f$

F/6.3   f = 100   β = −0.252   ω = 17.3°

TABLE 9

| Surface | r | d | $N_d$ | $\nu_d$ | Product name of material | |
|---|---|---|---|---|---|---|
| 1 | 69.319 | 5.96 | 1.78800 | 47.4 | LASF-n16 | (Sumita) |
| 2 | 205.002 | 0.28 | | | | |
| 3 | 27.678 | 10.20 | 1.59240 | 68.3 | GFK-68 | (Sumita) |
| 4 | 50.033 | 0.00 | | | | |
| 5 | 50.033 | 2.37 | 1.71736 | 29.5 | SF-1 | (Sumita) |
| 6 | 23.363 | 31.43 | | | | |
| 7 | −19.495 | 2.38 | 1.62004 | 36.3 | F-2 | (Sumita) |
| 8 | −56.477 | 0.00 | | | | |
| 9 | −56.477 | 7.57 | 1.77250 | 49.6 | LASF-n7 | (Sumita) |
| 10 | −28.464 | 1.82 | | | | |
| 11 | ∞ | 7.35 | 1.59240 | 68.3 | GFK-68 | (Sumita) |
| 12 | −65.279 | | | | | |

TABLE 10

$N_{da} + 0.015\nu_{da} = 2.62$
$N_{db} + 0.015\nu_{db} = 2.62$
$f_a = 0.894f$
$f_b = 1.102f$
$f_a/f_b = 0.811$
$f_4 = -0.492f$

F/4.0   f = 1000   β = −0.189   ω = 18.3°

TABLE 11

| Surface | r | d | $N_d$ | $\nu_d$ | Product name of material | |
|---|---|---|---|---|---|---|
| 1 | 31.583 | 9.67 | 1.49700 | 81.6 | S-FPL51 | (Ohara) |
| 2 | 650.085 | 0.39 | | | | |
| 3 | 29.227 | 5.47 | 1.62041 | 60.3 | SK-16 | (Sumita) |
| 4 | 73.789 | 1.07 | | | | |
| 5 | 194.591 | 2.40 | 1.61340 | 43.8 | KZFS-4 | (Sumita) |
| 6 | 20.106 | 22.53 | | | | |
| 7 | −19.387 | 2.33 | 1.61340 | 43.8 | KZFS-4 | (Sumita) |
| 8 | −201.906 | 0.00 | | | | |
| 9 | −201.906 | 8.21 | 1.59240 | 68.3 | GFK-68 | (Sumita) |
| 10 | −30.354 | 0.39 | | | | |
| 11 | −331.071 | 6.85 | 1.63854 | 55.5 | SK-18 | (Sumita) |
| 12 | −44.946 | | | | | |

TABLE 12

| | | | | |
|---|---|---|---|---|
| | $N_{da} + 0.015\nu_{da} = 2.72$ | | | |
| | $N_{db} + 0.015\nu_{db} = 2.62$ | | | |
| | $f_a = 0.664f$ | | | |
| | $f_b = 0.593f$ | | | |
| | $f_a/f_b = 1.121$ | | | |
| | $f_4 = -0.351f$ | | | |
| F/3.5 | f = 100 | $\beta = -0.3775$ | | $\omega = 11.2°$ |

TABLE 13

| Surface | r | d | $N_d$ | $\nu_d$ | Product name of material | |
|---|---|---|---|---|---|---|
| 1 | 32.042 | 4.05 | 1.77250 | 49.6 | LASF-N7 | (Sumita) |
| 2 | 59.749 | 0.20 | | | | |
| 3 | 21.520 | 4.58 | 1.49700 | 81.6 | S-FPL51 | (Ohara) |
| 4 | 35.847 | 0.00 | | | | |
| 5 | 35.847 | 1.87 | 1.62005 | 36.3 | F-2 | (Sumita) |
| 6 | 16.115 | 20.74 | | | | |
| 7 | −27.919 | 1.75 | 1.56732 | 42.8 | LF-6 | (Sumita) |
| 8 | 413.357 | 0.00 | | | | |
| 9 | 413.357 | 3.15 | 1.49700 | 81.6 | S-FPL51 | (Ohara) |
| 10 | −79.592 | 0.19 | | | | |
| 11 | −212.312 | 4.84 | 1.77250 | 49.6 | LASF-N | (Sumita) |
| 12 | −34.368 | | | | | |

TABLE 14

| | | | | |
|---|---|---|---|---|
| | $N_{da} + 0.015\nu_{da} = 2.72$ | | | |
| | $N_{db} + 0.015\nu_{db} = 2.72$ | | | |
| | $f_a = 0.979f$ | | | |
| | $f_b = 1.346f$ | | | |
| | $f_a/f_b = 0.728$ | | | |
| | $f_4 = -0.460f$ | | | |
| F/8.0 | f = 100 | $\beta = -0.075$ | | $\omega = 23.3°$ |

What is claimed is:

1. An image readout lens having a small chromatic aberration comprising, successively from an object side, positive first and second lenses each having a convex surface directed onto the object side, a negative third lens having a concave surface directed onto an image side, a negative fourth lens having a concave surface directed onto the object side, and positive fifth and sixth lenses each having a convex surface directed onto the image side, wherein a material forming at least one of said first and second lenses satisfies the following conditional expression (1); a material forming at least one of said fifth and sixth lenses satisfies the following conditional expression (2); of the lenses satisfying said conditional expression (1), the lens having a shorter focal length satisfies the following conditional expression (3); and, of the lenses satisfying said conditional expression (2), the lens having a shorter focal length satisfies the following conditional expression (4):

$$Nda + 0.015 \nu da > 2.58 \quad (1)$$

$$Ndb + 0.015 \nu db > 2.58 \quad (2)$$

$$0.59f < fa < 1.08f \quad (3)$$

$$0.53f < fb < 1.60f \quad (4)$$

wherein f is a focal length of the whole system;

fa is a focal length of the first or second lens (the lens having a shorter focal length when both lenses satisfy conditional expression (1)) using a material satisfying conditional expression (1);

fb is a focal length of the fifth or sixth lens (the lens having a shorter focal length when both lenses satisfy conditional expression (2)) using a material satisfying conditional expression (2);

Nda is a refractive index of a lens material;

Ndb is a refractive index of a lens material;

νda is an Abbe number of a lens material; and

νdb is an Abbe number of a lens material.

2. An image readout lens according to claim 1, wherein the following conditional expressions (5) and (6):

$$0.46 < fa/fb < 1.23 \quad (5)$$

$$-0.56f < f4 < -0.31f \quad (6)$$

wherein f4 is a focal length of the fourth lens are satisfied.

3. An image readout lens according to claim 1, wherein each of said lenses is constituted by a material which contains neither lead nor arsenic.

4. An image readout apparatus comprising the image readout lens of claim 1.

* * * * *